United States Patent
Sakaguchi et al.

(10) Patent No.: US 9,261,042 B2
(45) Date of Patent: Feb. 16, 2016

(54) VEHICLE START CONTROL DEVICE

(75) Inventors: Shigeyuki Sakaguchi, Yokohama (JP); Masao Shiomi, Sagamihara (JP); Masahiro Omori, Ebina (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 315 days.

(21) Appl. No.: 13/703,803

(22) PCT Filed: May 6, 2011

(86) PCT No.: PCT/JP2011/060593
§ 371 (c)(1),
(2), (4) Date: Dec. 12, 2012

(87) PCT Pub. No.: WO2011/158570
PCT Pub. Date: Dec. 22, 2011

(65) Prior Publication Data
US 2013/0103288 A1    Apr. 25, 2013

(30) Foreign Application Priority Data
Jun. 15, 2010   (JP) .................................. 2010-135652

(51) Int. Cl.
*B60K 26/02* (2006.01)
*F02D 45/00* (2006.01)
*B60K 23/02* (2006.01)
(Continued)

(52) U.S. Cl.
CPC ................ *F02D 45/00* (2013.01); *B60K 23/02* (2013.01); *B60K 26/021* (2013.01); *F16D 48/06* (2013.01); *F16D 2500/3068* (2013.01); *F16D 2500/3107* (2013.01); *F16D 2500/3121* (2013.01); *F16D 2500/3144* (2013.01); *F16D 2500/31413* (2013.01); *F16D 2500/7101* (2013.01)

(58) Field of Classification Search
CPC ... F02D 41/06; F16H 2059/142; F16H 63/42; B60K 26/021–26/023; B60K 2026/022–2026/023; B60W 40/06; B60W 40/064; B60W 40/068; B60W 40/072; B60W 40/076; B60W 40/1005
USPC .......................................... 701/113; 340/456
See application file for complete search history.

(56) References Cited

U.S. PATENT DOCUMENTS 3,646,822 A * 3/1972 Pocaterra .......................... 74/53
4,093,050 A * 6/1978 Mizuno ......................... 477/195
5,557,519 A * 9/1996 Morita .............................. 701/1
(Continued)

FOREIGN PATENT DOCUMENTS

JP           60-15939 U       2/1985
JP       H 05231194 A   *   9/1993
(Continued)

*Primary Examiner* — Hung Q Nguyen
*Assistant Examiner* — Josh Campbell
(74) *Attorney, Agent, or Firm* — Foley & Lardner LLP (57) ABSTRACT

A depression force of an accelerator pedal 2 is increased than a base depression force by a predetermined amount when an accelerator opening degree becomes a predetermined accelerator opening degree threshold value at which an engine speed necessary at a start of a vehicle can be obtained by a depression of the accelerator pedal 2 in a state where a clutch 102 is disengaged at the start of the vehicle. With this, at the start of the vehicle, a driver becomes easy to hold the accelerator pedal 2 in a constant accelerator opening degree at which the engine speed necessary at the start can be obtained. It is possible to smoothly engage the clutch 102, and then to attain the smooth start of the vehicle.

10 Claims, 5 Drawing Sheets (51) Int. Cl.
*F16D 48/06* (2006.01)
*B60K 26/04* (2006.01)

(56) References Cited

U.S. PATENT DOCUMENTS

| | | | |
|---|---|---|---|
| 6,161,891 A * | 12/2000 | Blakesley | 296/65.01 |
| 7,457,694 B2 * | 11/2008 | Hijikata | 701/36 |
| 7,510,506 B2 * | 3/2009 | Kupper et al. | 477/180 |
| 2002/0133288 A1 * | 9/2002 | Minami et al. | 701/114 |
| 2007/0106475 A1 * | 5/2007 | Kondoh | 701/301 |
| 2009/0030584 A1 * | 1/2009 | Meng | F16H 63/42 |
| | | | 701/64 |
| 2011/0137543 A1 * | 6/2011 | Gibson | F02D 41/0087 |
| | | | 701/113 |

FOREIGN PATENT DOCUMENTS

| | | |
|---|---|---|
| JP | 6-42901 Y2 * | 11/1994 |
| JP | 9-95157 A | 4/1997 |
| JP | 2001-263138 A | 9/2001 |
| JP | 2003260951 A * | 9/2003 |
| WO | WO 2010013125 A1 * | 2/2010 |

* cited by examiner

1 — VEHICLE BODY
2 — ACCELERATOR PEDAL
3 — ROTATION SHAFT
4 — RETURN SPRING
5 — BEARING
6 — ACCELERATOR POSITION SENSOR
7 — VARIABLE FRICTION PLATE
7a — FRICTION MEMBER
7b — FRICTION MEMBER
8 — FIXED SHAFT
9 — ACTUATOR
10 — CONTROL UNIT

VEHICLE START CONTROL DEVICE

TECHNICAL FIELD

This invention relates to a vehicle start control device provided with a manual transmission.

BACKGROUND ART

For example, a patent document 1 discloses an art to vary an engine speed to a target engine speed higher than an idling rotational speed in accordance with a clutch position when a throttle opening degree is equal to or smaller than a predetermined value at a start of a vehicle provided with a manual transmission. In this patent document 1, an increase rate of the target engine speed with respect to the idling rotational speed is set to be smaller with respect to a state at an initial stage of the engagement of the clutch as the engagement of the clutch proceeds.

However, in this patent document 1, it is necessary to return the increased engine speed to the original speed after the start of the vehicle. With this, the deceleration feeling may be provided to the driver. Moreover, the vehicle can run without the depression of the accelerator pedal by the driver. Accordingly, the unnatural feeling may be provided to the driver.

That is, in this patent document 1, the vehicle is likely to be not smoothly started without providing the unnatural feeling to the driver.

PRIOR ART DOCUMENT

Patent Document

Patent Document 1: Japanese Patent Application Publication No. 2001-263138

SUMMARY OF THE INVENTION

A start control device for a vehicle according to the present invention comprises an information transmitting means configured to inform a driver that an accelerator pedal becomes the accelerator opening degree at which the clutch pedal is returned when the accelerator opening degree becomes equal to or greater than a predetermined accelerator opening degree threshold value by a depression of the accelerator pedal in a state where the clutch is disengaged by a depression of the clutch pedal at a start of the vehicle.

By the present invention, the driver becomes easy to hold the accelerator pedal to the constant accelerator opening degree at which the clutch pedal is returned at the start of the vehicle. Accordingly, it is possible to smoothly engage the clutch, and to readily attain the smooth start of the vehicle.

DESCRIPTION OF EMBODIMENTS

Hereinafter, one embodiment of the present invention will be illustrated in detail with reference to the drawings.

Figure 1:
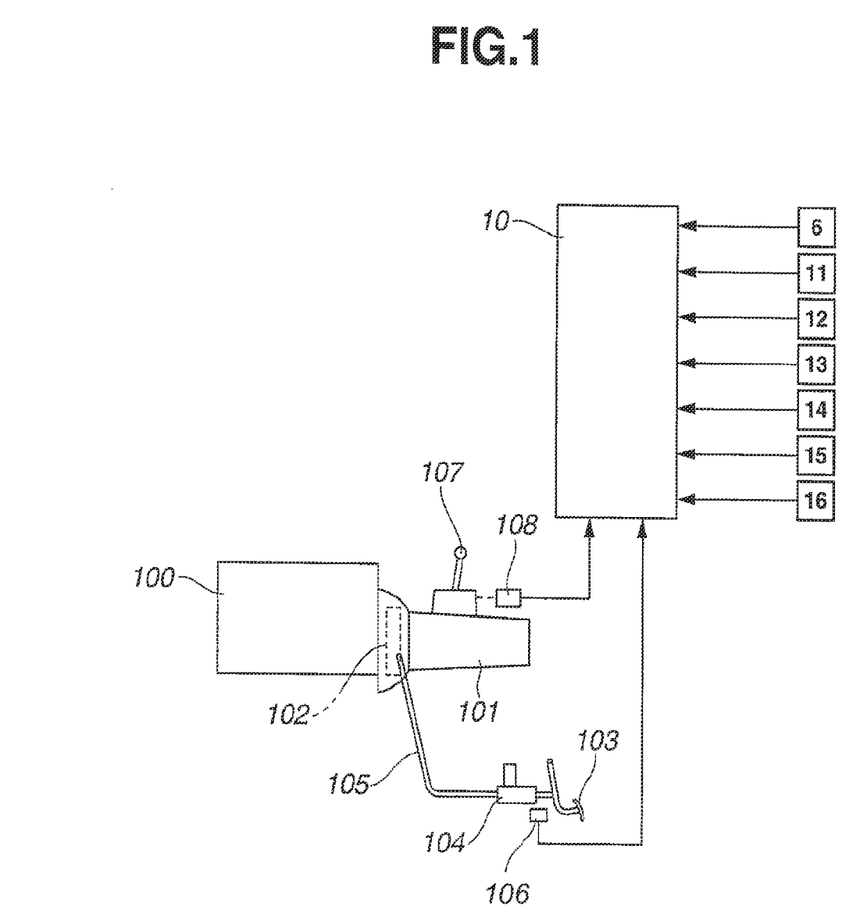
FIG. 1 is an explanatory view schematically showing a schematic configuration of a power system of a vehicle to which the present invention is applied.

FIG. 1 is an explanatory view schematically showing a schematic configuration of a power system of a vehicle to which the present invention is applied. An engine 100 which is an internal combustion engine mounted on the vehicle is connected through a clutch 102 to a manual transmission 101. A driving force of the engine 100 is transmitted to driving wheels (not shown) of the vehicle in accordance with a transmission gear ratio selected in this manual transmission 101.

The clutch 102 is arranged to receive an operation force of a clutch pedal 103 through a master cylinder 104 and a hydraulic pressure passage 105. Moreover, there is provided a clutch switch 106 arranged to sense, for example, a depression operation of a clutch pedal 103, for sensing an ON state and an OFF state (engagement and disengagement) of the clutch 102.

Furthermore, there is provided a gear position sensing switch 108 arranged to sense a selection of one of the gear positions of the first speed—the fifth speed and so on, with respect to a shift lever 107 of the transmission 101.

Detection signals of these clutch switch 106 and gear position sensing switch 108 are inputted into a control unit 10 which is constituted by a micro-computer system.

Besides, a numeral 6, and numerals 11-16 in FIG. 1 are various sensors arranged to output respective detection signals to the control unit 10, and will be illustrated later.

Figure 2:
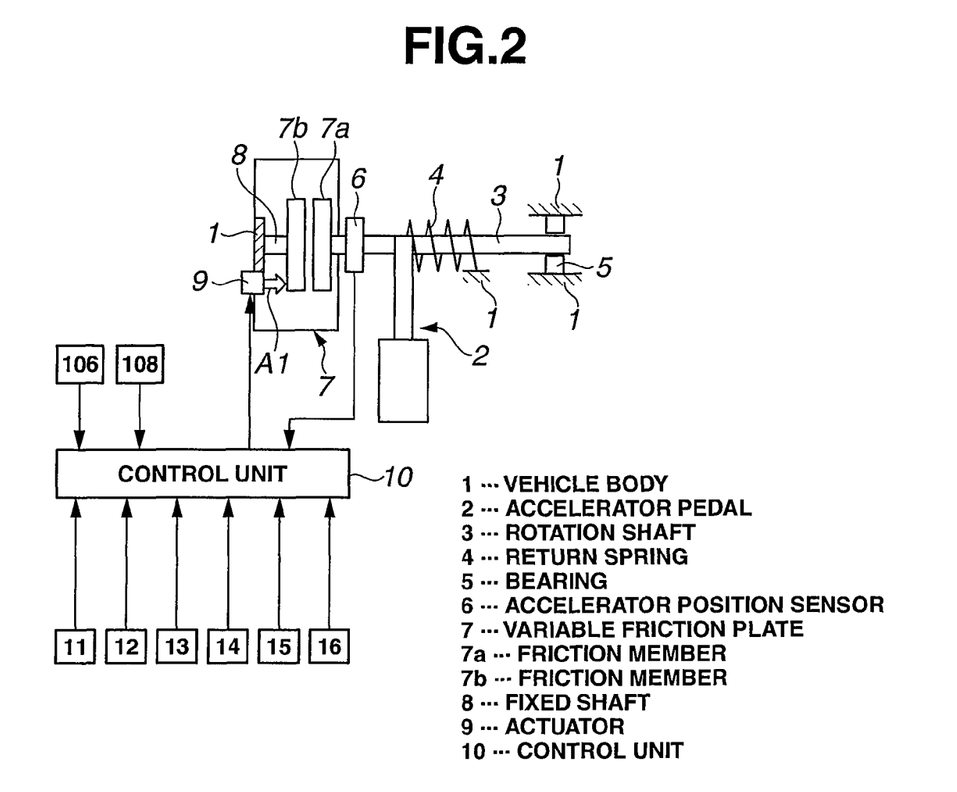
FIG. 2 is an explanatory view schematically showing a system configuration of an accelerator pedal depression force control apparatus which is applied to the present invention, and a schematic configuration of a depression force varying mechanism.
Figure 3:
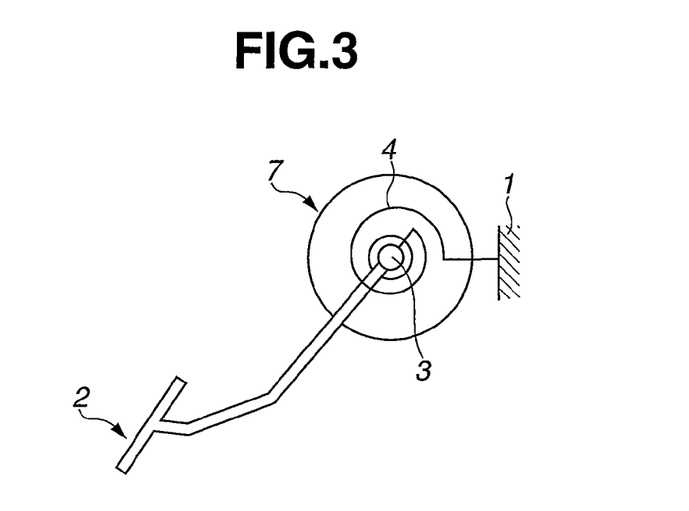
FIG. 3 is an explanatory view schematically showing the depression force varying mechanism which is applied to the present invention.

Next, an accelerator pedal depression force control apparatus which is applied to the above-described vehicle will be illustrated by using FIG. 2 and FIG. 3.

FIG. 2 is an explanatory view schematically showing a system configuration of the accelerator pedal depression force control apparatus, and a schematic configuration of a depression force varying mechanism.

This accelerator pedal depression force control apparatus is basically configured to variably control a depression force (operation reaction force) of an accelerator pedal 2 provided to a vehicle body 1 of a vehicle (not shown). As described below, the accelerator pedal depression force control apparatus includes a means configured to sense an opening degree (depression amount) of the accelerator pedal 2 provided to the vehicle, and a means configured to vary the depression force of the accelerator pedal 2 from a base depression force. The accelerator pedal depression force control apparatus is configured to increase the depression force of the accelerator pedal 2 than (beyond) the base depression force by a predetermined increase amount when the opening degree of the accelerator pedal 2 becomes greater than a predetermined accelerator pedal opening degree threshold value.

As shown in FIGS. 2 and 3, the accelerator pedal 2 is provided on a rotation shaft 3. The accelerator pedal 2 is arranged to be swung about the rotation shaft 3. The accelerator pedal 2 receives a reaction force in an accelerator closing direction by a return spring 4 which may have various shapes, and which has one end fixed to the vehicle body 1, and the other end fixed to the rotation shaft 3. Moreover, one end of the rotation shaft 3 is rotatably supported by the vehicle body 1 through a bearing 5. On the other hand, an accelerator position sensor 6 serving as an accelerator opening degree sensing means is provided near the other end of the rotation shaft 3.

The depression force varying mechanism is constituted by a variable friction plate 7 including a pair of friction members 7a and 7b which confront each other, and which are arranged to provide the frictional force to the rotation of the rotation shaft 3. One friction member 7a is mechanically connected to an end portion of the rotation shaft 3. The other friction member 7b is supported through splines and so on to a fixed shaft 8 so as to be moved in an axial direction, and so as not to be rotated. The fixed shaft 8 is fixed to and supported by the vehicle body 1. Moreover, an actuator (for example, electromagnetic solenoid) 9 arranged to urge the friction member 7b toward the friction member 7a is fixed to the vehicle body 1.

The variable friction plate 7 moves the friction member 7b in the axial direction (in a direction of an arrow A1 in FIG. 2) by the actuation of the actuator 9. With this, the variable friction plate 7 variably controls the friction force between the friction member 7a and the friction member 7b. This actuation of the actuator 9 is controlled by the above-described control unit 10. Accordingly, it is possible to vary the friction force applied to the rotation shaft 3, and then the depression force at the depression of the accelerator pedal 2, by controlling the actuation of the actuator 9 by the control unit 10.

The control unit 10 receives signals of various sensors such as an engine speed sensor 11 arranged to sense the engine speed, a vehicle speed sensor 12 arranged to sense the vehicle speed, an intake air temperature sensor 13 arranged to sense an intake air temperature, an atmosphere pressure sensor 14 arranged to sense an ambient atmosphere pressure, an acceleration sensor 15 arranged to sense a road gradient from an inclination of the vehicle, and a seat pressure sensor 16 built in each seat of the vehicle, and arranged to sense whether or not the occupant gets on, in addition to the signals of the above-described clutch switch 106, the above-described gear position sensing switch 108, and the above-described accelerator position sensor 6 arranged to sense the opening degree of the accelerator pedal 2.

Figure 4:
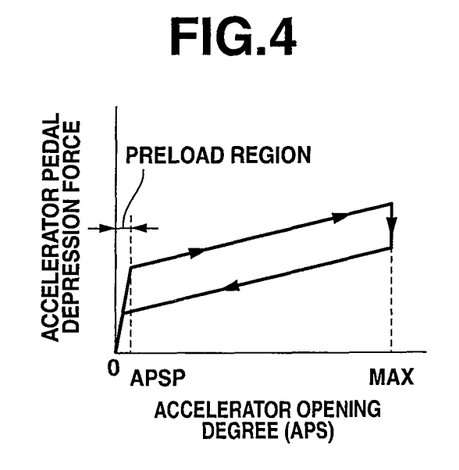
FIG. 4 is a characteristic view showing an example of a characteristic of an accelerator pedal depression force.

FIG. 4 schematically shows a characteristic of a basic depression force, that is, a base depression force of the depression force of the accelerator pedal in this embodiment. This base depression force is increased to be substantially proportional to the accelerator opening degree while having an appropriate hysteresis in the opening degree increasing direction and in the opening degree decreasing direction. Moreover, an initial region (preload region) in which the base depression force is suddenly increased is set in a small accelerator opening degree region.

As described in detail below, the base depression force is proportionally increased in the increasing direction of the accelerator opening degree from a predetermined minute opening degree (an accelerator opening degree APSP) to a maximum opening degree (an accelerator opening degree MAX). The initial region in which the accelerator opening degree is from zero to the minute opening degree is the preload region in which the base depression force is increased at a relatively large rate in accordance with the increase of the accelerator opening degree.

In this embodiment, in a case where the accelerator opening degree becomes equal to or greater than a predetermined accelerator opening degree threshold value when the accelerator pedal 2 is depressed at the start of the vehicle in a state where the clutch 102 is disengaged, the depression force of the accelerator pedal 2 is increased than the base depression force on the depressed side in a stepped manner, so as to suppress the further depression.

In this case, the accelerator opening degree threshold value is the accelerator opening degree at which the engine speed necessary at the start of the vehicle can be obtained, and which is previously stored in the control unit 10.

Figure 5:
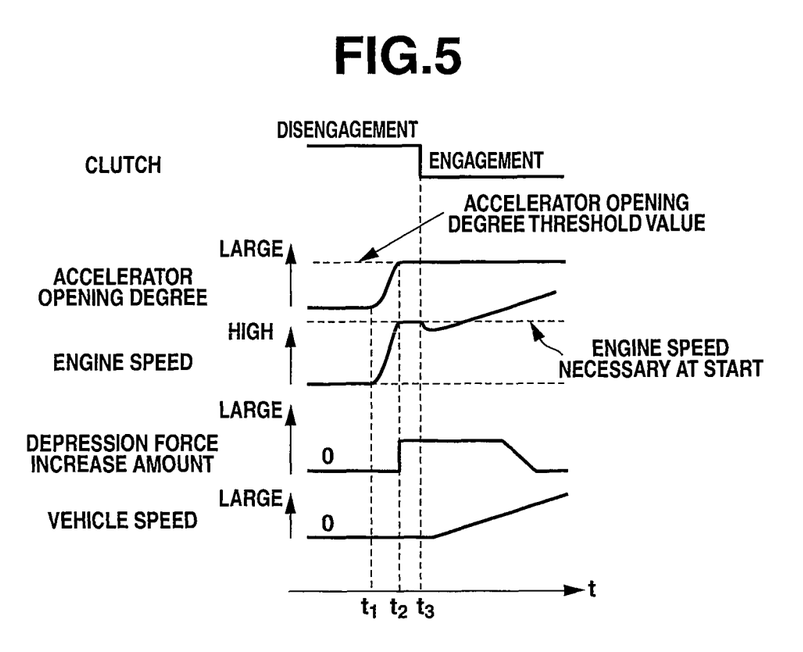
FIG. 5 is a timing chart showing variations of the various parameters at a start of the vehicle in the embodiment of the present invention.

FIG. 5 is a timing chart showing states of the various parameters at the start of the vehicle in this embodiment.

A timing t1 is a timing at which the driver of the vehicle starts to depress the accelerator pedal 2 for starting the vehicle in the stop state, in a state where the clutch pedal 103 is depressed and the clutch 102 is disengaged.

Then, the driver further depresses the accelerator pedal 2, and the accelerator opening degree becomes the above-described accelerator opening degree threshold value at a timing t2. A predetermined depression force increase amount (depression force increase amount) is added to the base depression force of the accelerator pedal 2.

At the timing t2, the accelerator opening degree becomes the above-described accelerator opening degree threshold value. The depression force of the accelerator pedal 2 is increased than the base depression force. Accordingly, the depression of the accelerator pedal 2 is suppressed. The driver starts to return the clutch pedal 103 by the increase of the depression force of the accelerator pedal 2.

At a timing t3 at which the accelerator opening degree is held to an accelerator opening degree at which the engine speed necessary at the start of the vehicle can be obtained, the clutch 102 is engaged and the vehicle is started.

The predetermined increase amount of the depression force of the accelerator pedal 2 which is added to the base depression force at timing t2 is eliminated when a predetermined time elapsed after the engagement of the clutch 102, or when the accelerator pedal 2 is returned after the engagement of the clutch 102.

For smoothly starting at the start in the vehicle provided with the manual transmission 101, it is necessary to appropriately harmonize the operations of the accelerator pedal 102 and the clutch pedal 103.

Figure 6:
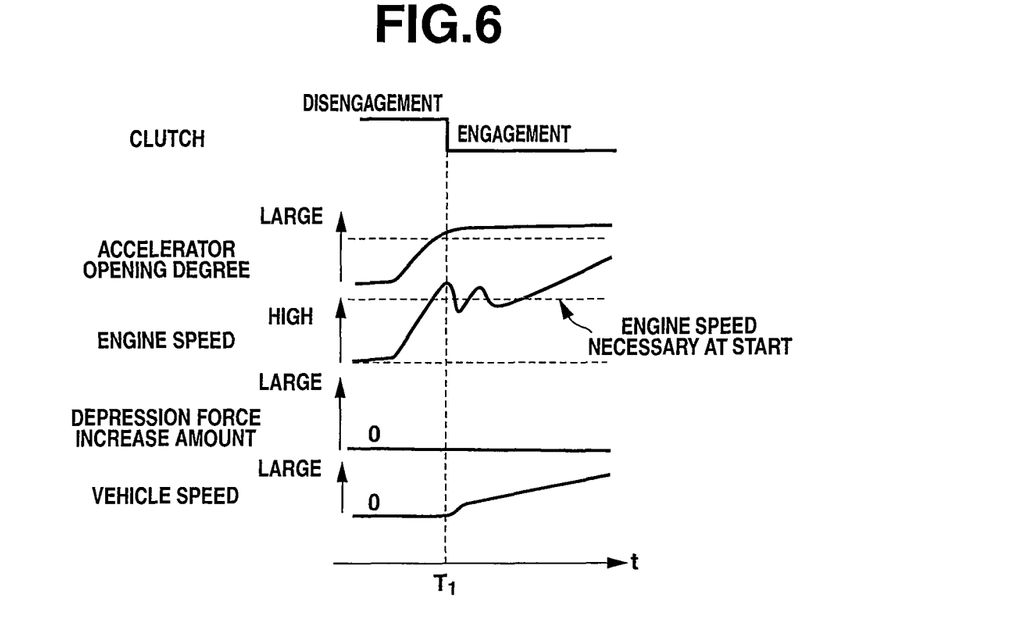
FIG. 6 is a timing chart showing variations of the various parameters at the start of the vehicle in a comparative example.

As shown in a comparative example shown in FIG. 6, at a timing T1 at which the clutch 102 disengaged for starting the vehicle in the stop state is engaged, when the engine speed at that time is greater than the engine speed necessary at the start of the vehicle, the sudden start, the excessive abrasion of the clutch 102 and so on are generated at the engagement of the clutch 102. That is, the smooth engagement of the clutch 102 is not performed, the vehicle is likely to be not smoothly started.

Figure 7:
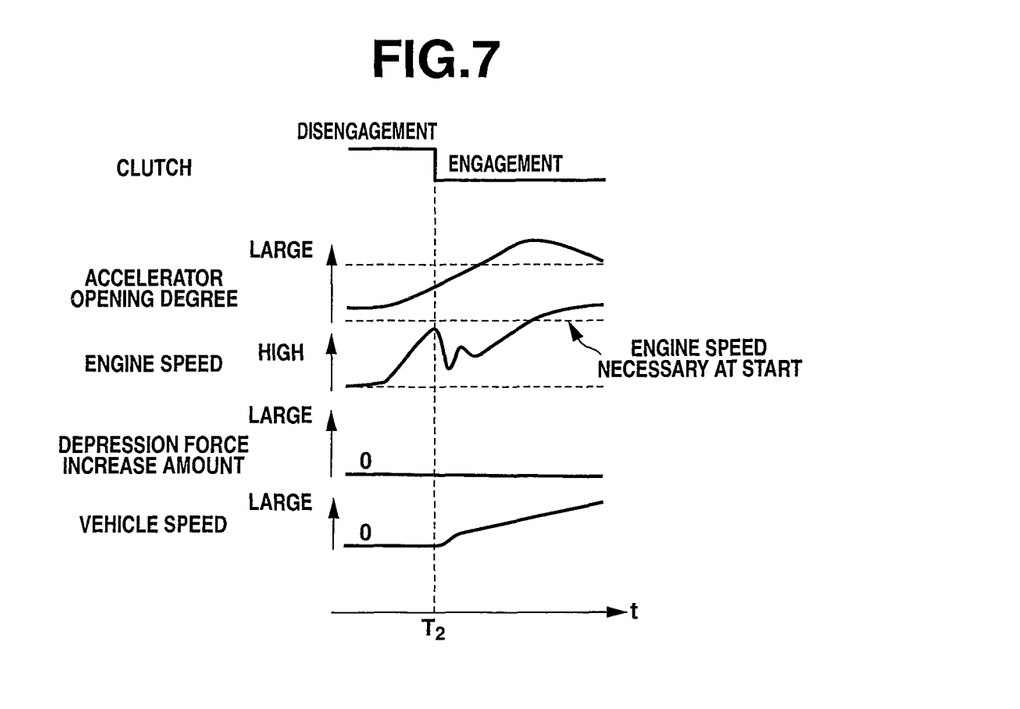
FIG. 7 is a timing chart showing variations of the various parameters at the start of the vehicle in the comparative example.

Moreover, in a comparative example shown in FIG. 7, at a timing T2 at which the clutch 102 disengaged for starting the vehicle in the stop state is engaged, when the engine speed at that time is smaller than the engine speed necessary at the start of the vehicle, the engine load is excessively increased at the engagement of the clutch 102, so that the engine speed is suddenly decreased. The vehicle is likely to be not smoothly started. The engine may be stopped according to the circumstances.

In contrast, in this embodiment shown in FIG. 5, when the accelerator pedal 2 is depressed at the start of the vehicle in a state where the clutch 102 is disengaged by the depression of the clutch pedal 103 and the accelerator opening degree becomes equal to or greater than the accelerator opening degree (the accelerator opening degree threshold value) at (by) which the engine speed necessary at the start of the vehicle can be obtained, the depression force of the accelerator pedal 2 is increased than the base depression force by the predetermined amount. With this, it is possible to inform the driver that the accelerator opening degree becomes the opening degree at which the engine speed necessary at the start of the vehicle can be obtained, that is, the opening degree at which the opening degree at which the clutch pedal 103 is returned.

Therefore, the driver becomes easy to hold the accelerator pedal 2 to the constant accelerator opening degree at which the engine speed necessary at the start of the vehicle can be obtained, that is, the constant accelerator opening degree at which the clutch pedal 103 is returned. Accordingly, it is possible to smoothly engage the clutch 102, and to readily attain the smooth start of the vehicle.

In particular, when the accelerator opening degree becomes the predetermined accelerator opening degree threshold value at which the engine speed necessary at the start of the vehicle can be obtained, the depression force of the accelerator pedal 2 is increased than the base depression force by the predetermined amount. With this, it is possible to suppress the depression of the accelerator pedal 2 which is equal to or greater than the accelerator opening degree at which the engine speed necessary at the start of the vehicle can be obtained. Accordingly, the driver becomes easy to hold the accelerator opening degree at which the engine speed necessary at the start of the vehicle can be obtained, and the driver can concentrate on the operation of the clutch pedal 103.

Figure 8:
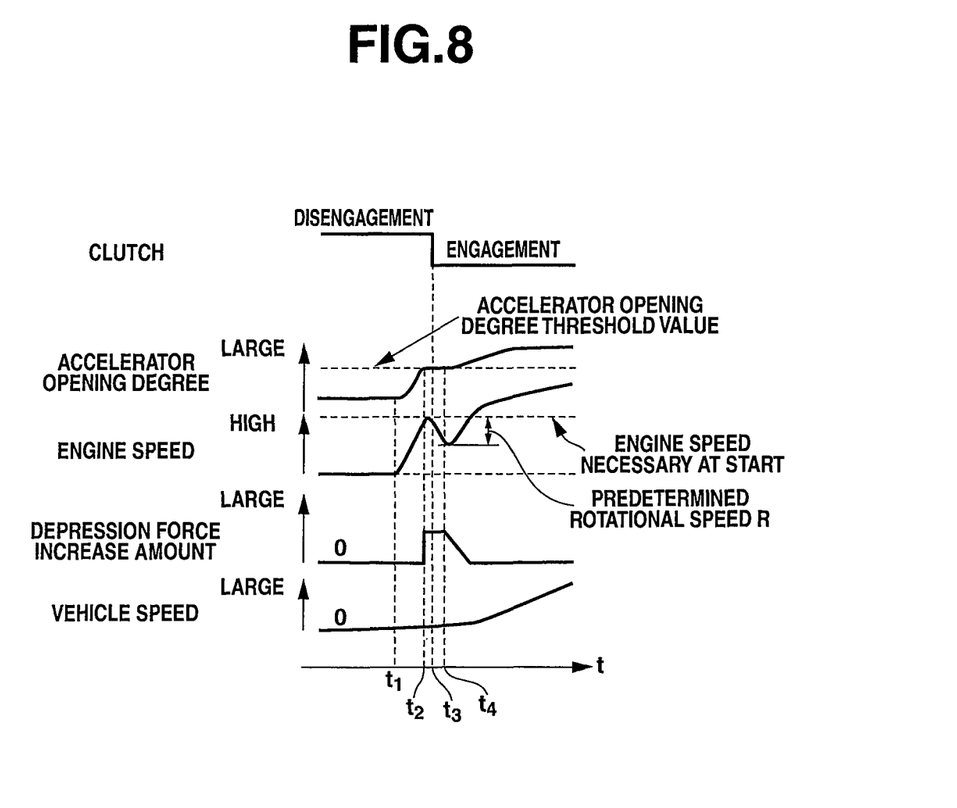
FIG. 8 is a timing chart showing variations of the various parameters at the start of the vehicle in the embodiment of the present invention.

Moreover, in this embodiment, as shown in FIG. 8, when the engine speed is decreased with respect to the engine speed necessary at the start of the vehicle by a predetermined rotational speed R or more at the timing immediately after the start of the vehicle, that is, during a predetermined time period after the engagement of the clutch 102, the predetermined depression force increase amount added to the base depression force at the timing t2 is eliminated at a timing t4 at which the engine speed is decreased with respect to the engine speed necessary at the start of the vehicle by the predetermined rotational speed R or more, so as to return the depression force of the accelerator pedal 2 to the base depression force. Then, the predetermined depression force increase amount added to the base depression force is decreased at a constant rate from the timing t4.

In a case where the running resistance of the vehicle is large, for example, in case of the hill start, the increase of the number of the occupant, the increase of the superimposed load and so on, the load of the vehicle immediately after the start of the vehicle becomes relatively large, so that the engine speed is decreased immediately after the start of the vehicle.

Accordingly, in this embodiment, the predetermined increase amount of the depression force which is added to the base depression force is eliminated in the above case. With this, the accelerator pedal 2 becomes easy to be depressed (the depression of the accelerator pedal 2 becomes easy to be added). That is, it is possible to promote the depression of the accelerator pedal 2 for compensating for the insufficient torque amount. That is, it is possible to be easy to depress the accelerator pedal 2 (to add the depression of the accelerator pedal 2) in accordance with the necessary engine torque.

Besides, in this embodiment, the load of the vehicle is estimated from the decrease amount of the engine speed after the engagement of the clutch 102 as described above. However, the load of the vehicle immediately after the start of the vehicle may be estimated from the variation amount of the intake air amount immediately after the start of the vehicle.

Moreover, the above-described accelerator opening degree threshold value may be corrected in accordance with the magnitude of the running resistance of the vehicle.

In particular, before the accelerator opening degree becomes the accelerator opening degree threshold value previously stored in the control unit 10 at the start of the vehicle, for example, the above-described accelerator sensor 15 senses the hill start, or the above-described seat pressure sensor 16 senses the number of the occupant or the superimposed load. The accelerator opening degree threshold value previously stored in the control unit 10 may be corrected in accordance with the gradient of the hill and the total weight of the vehicle. In this case, the accelerator opening degree threshold value is corrected to be relatively larger as the gradient of the hill is larger and as the total weight of the vehicle is larger.

In this way, it is possible to attain the smooth start of the vehicle by correcting the accelerator opening degree threshold value in accordance with the running resistance of the vehicle, irrespective of the running resistance of the vehicle.

Moreover, the engine speed at the same accelerator opening degree becomes relatively smaller as the air density is smaller. Accordingly, the above-described accelerator opening degree threshold value may be corrected in accordance with the ambient intake air density at the start of the vehicle.

In particular, the accelerator opening degree threshold value previously stored in the control unit 10 is corrected, for example, in accordance with the air density calculated from the intake air temperature sensed by the above-described intake air temperature sensor 13, and the atmosphere pressure sensed by the above-described atmosphere pressure sensor 14, before the accelerator opening degree becomes the accelerator opening degree threshold value previously stored in the control unit 10 at the start of the vehicle. The air density becomes smaller as the intake air temperature is higher, and as the atmosphere pressure on the highlands and so on is smaller. Accordingly, the accelerator opening degree threshold value is corrected to be relatively larger as the air density is smaller.

In this way, the accelerator opening degree threshold value previously stored in the control unit 10 is corrected in accordance with the air density around the vehicle. With this, it is possible to attain the smooth start of the vehicle, irrespective of the ambient air density around the vehicle.

Moreover, in the above-described embodiment, the driver is informed that the accelerator opening degree becomes the opening degree at which the engine speed necessary at the start of the vehicle can be obtained, that is, the opening degree at which the clutch pedal 103 is returned, by increasing the accelerator pedal depression force than the base depression force. However, the information transmitting means to inform that the accelerator opening degree becomes the opening degree at which the engine speed necessary at the start of the vehicle can be obtained is not limited to the means for increasing the accelerator opening degree than the base depression force. For example, the information transmitting means may be a visual means and an auditory means such as lighting of a lamp, and a sound, a display on a screen of a car navigation system

The invention claimed is:

1. A start control device for a vehicle including a manual transmission, a clutch arranged to connect and disconnect power transmitting from an engine to a driving wheel at a shift operation by the manual transmission, a clutch pedal arranged to operate an engagement and a disengagement of the clutch, and an accelerator opening degree sensor arranged to sense an accelerator opening degree, the vehicle start control device comprising:
   an information transmitting indicator configured to inform a driver that a depression of an accelerator pedal becomes an accelerator opening degree at which the clutch pedal is returned when the accelerator opening degree becomes equal to or greater than a predetermined accelerator opening degree threshold value in a state where the clutch is disengaged by a depression of the clutch pedal at a starting of the vehicle from a stop state,
   the accelerator opening degree threshold value being corrected in accordance with a running resistance at the starting of the vehicle, and the accelerator opening degree threshold value at a large running resistance being relatively larger than the accelerator opening degree threshold value at a small running resistance.

2. The start control device for the vehicle as claimed in claim 1, wherein the information transmitting indicator is a depression force varying mechanism configured to vary a depression force of the accelerator pedal; and the information transmitting indicator is configured to increase the depression force of the accelerator pedal to a force greater than a base depression force by a predetermined amount when the accelerator opening degree becomes equal to or greater than the accelerator opening degree threshold value.

3. The start control device for the vehicle as claimed in claim 1, wherein the accelerator opening degree threshold value is an accelerator opening degree at which an engine speed necessary at the starting of the vehicle can be obtained.

4. The start control device for the vehicle as claimed in claim 2, wherein the increase amount of the depression force with respect to the base depression force, which is generated by the depression force varying mechanism, is decreased when a load of the vehicle is large after the engagement of the clutch.

5. The start control device for the vehicle as claimed in claim 4, wherein it is judged that the load of the vehicle is large when an engine speed immediately after the engagement of the clutch is decreased by a value equal to or greater than a predetermined rotational speed.

6. The start control device for the vehicle as claimed in claim 1, wherein the vehicle start control device comprises an intake air density sensor configured to sense an air density; the accelerator opening degree threshold value is corrected in accordance with an ambient intake air density at the starting of the vehicle; and the accelerator opening degree threshold value at a small intake air density is relatively larger than the accelerator opening degree threshold value at a large intake air density.

7. The start control device for the vehicle as claimed in claim 1, wherein the information transmitting indicator is at least one of a visual indicator and an auditory indicator.

8. The start control device for the vehicle as claimed in claim 1, wherein the start control device comprises an accelerator sensor configured to sense a gradient of a hill, and wherein the accelerator opening degree threshold value is corrected in accordance with the gradient of the hill, the accelerator opening degree threshold value at a large gradient being relatively larger than the accelerator opening degree threshold value at a small gradient.

9. The start control device for the vehicle as claimed in claim 8, wherein the start control device comprises a seat pressure sensor configured to sense an increase in a total weight of the vehicle caused by occupants in the vehicle, and wherein the accelerator opening degree threshold value is corrected in accordance with the total weight of the vehicle, the accelerator opening degree threshold value at a large weight being relatively larger than the accelerator opening degree threshold value at a small weight.

10. The start control device for the vehicle as claimed in claim 2, wherein the depression force varying mechanism comprises a variable friction plate.

* * * * *